United States Patent [19]

Khan et al.

[11] Patent Number: 4,889,604
[45] Date of Patent: Dec. 26, 1989

[54] PROCESS FOR THE PHOTOCATALYTIC DECOMPOSITION OF WATER INTO HYDROGEN AND OXYGEN

[75] Inventors: M. M. Taqui Khan; R. Chandra Bhardwaj, both of Gujarat, India

[73] Assignee: Council of Scientific & Industrial Research, New Delhi, India

[21] Appl. No.: 82,816

[22] Filed: Aug. 6, 1987

[51] Int. Cl.$^4$ .............................................. C25B 1/02
[52] U.S. Cl. ............................ 204/157.5; 204/157.52
[58] Field of Search ............................ 204/157.5, 129

[56] References Cited

U.S. PATENT DOCUMENTS

| | | | |
|---|---|---|---|
| 4,484,992 | 11/1984 | Bühler et al. | 204/157.52 |
| 4,515,667 | 5/1985 | Loza | 204/157.9 |
| 4,521,499 | 6/1985 | Switzer | 204/59 R |
| 4,592,807 | 6/1986 | Switzer | 204/92 |

Primary Examiner—John F. Niebling
Assistant Examiner—Ben C. Hsing
Attorney, Agent, or Firm—Ladas & Parry

[57] ABSTRACT

Hydrogen and oxygen are obtained by the photocatalytic decomposition of water by passing light in an inert atmosphere through an aqueous solution of dioxygen complex of ruthenium and EDTA in which is suspended a semiconductor of hexagonal crystal structure loaded with a noble metal and a transition metal oxide. Hydrogen and oxygen are known to have various uses. Precipitation of the semiconductor material and annealing it at a temperature from 300°–350° C. result in the semiconductor of hexagonal structure which is suspended in the aqueous solution.

11 Claims, 2 Drawing Sheets

RATE OF HYDROGEN PRODUCTION FROM WATER UNDER ILLUMINATION BY VISIBLE LIGHT (A) $CdS/Rh/RuO_2$ (B) $CdS/Pt/RuO_2$ (C) $CdS/Ir/RuO_2$ IN PRESENCE OF $[\{Ru(OH)(edta)\}_2(O_2)]$

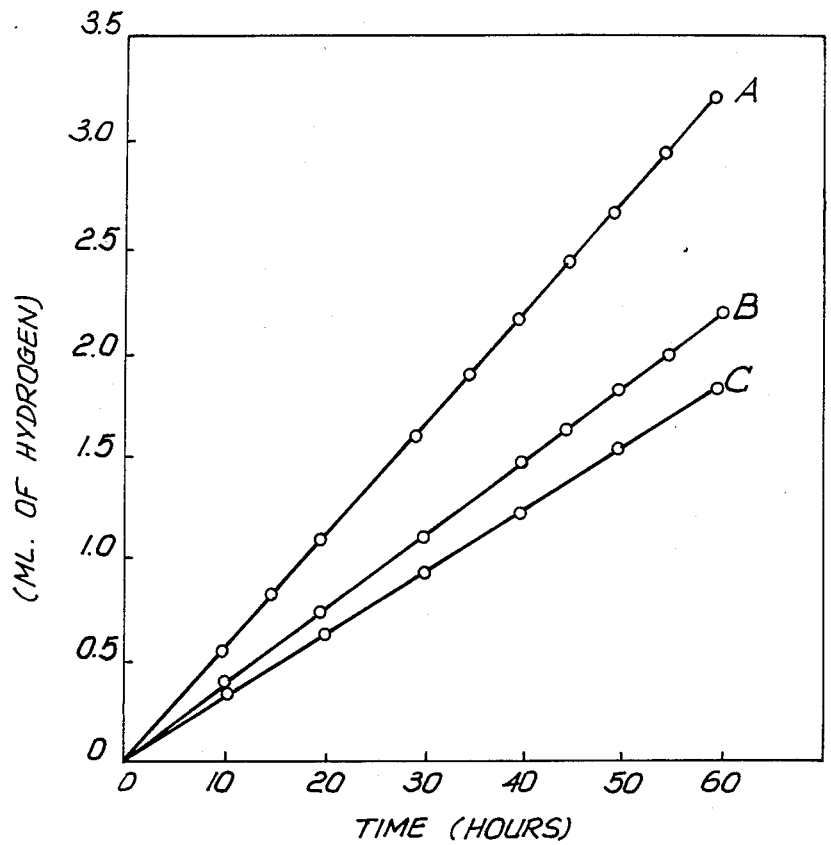
FIG. 1 RATE OF HYDROGEN PRODUCTION FROM WATER UNDER ILLUMINATION BY VISIBLE LIGHT (A) $CdS/Rh/RuO_2$ (B) $CdS/Pt/RuO_2$ (C) $CdS/Ir/RuO_2$ IN PRESENCE OF $[\{Ru(OH)(edta)\}_2(O_2)]$

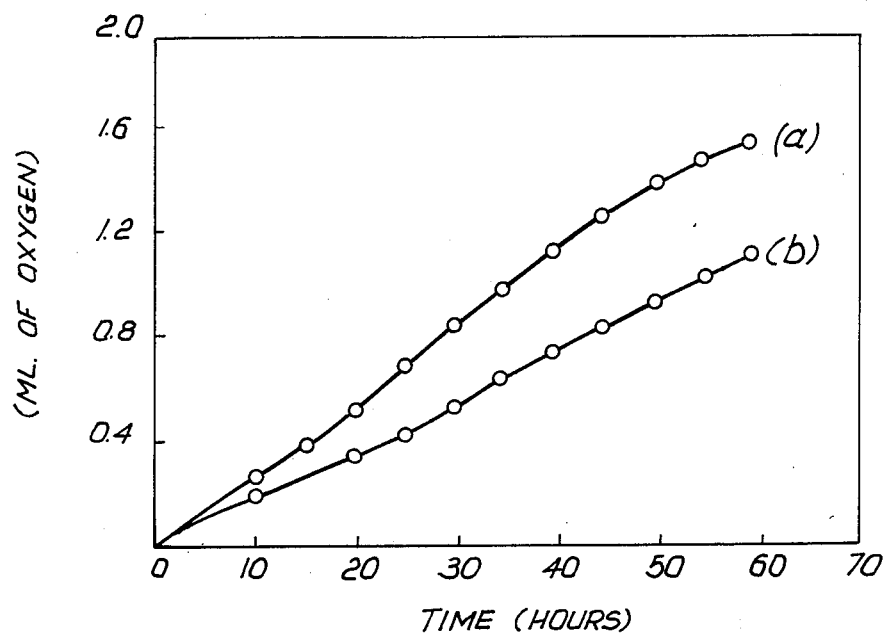
FIG. 2 RATE OF OXYGEN PRODUCTION FROM WATER UNDER ILLUMINATION BY VISIBLE LIGHT. (A) $CdS/Rh/RuO_2$ AND (B) $CdS/Pt/RuO_2$ IN THE PRESENCE OF $[\{Ru(OH)(edta)\}_2(O_2)]$

PROCESS FOR THE PHOTOCATALYTIC DECOMPOSITION OF WATER INTO HYDROGEN AND OXYGEN

The present invention relates to the photocatlytic decomposition of water into hydrogen and oxygen and to the production of a semiconductor therefor.

Hydrogen is one of the products of this invention which is simultaneously produced with oxygen and this has never been achieved before. Uses of these products are very well known. For example, hydrogen is used for the hydrogenation of essential oils, in fuel cells and is also considered to be the fuel of the future on depletion of fossil fuel whereas oxygen, apart from it being an important element for the survival of living beings, has multifarious uses including oxidation reactions.

At present, hydrogen is produced by the electrolysis of water but this is a slow process and consumes electricaL energy. Gratzel et al reported the production of hydrogen from water but the biggest drawback in this system has been that it uses EDTA (Ethylene diamine tetra-acetic acid) as a sacrificial electron donor and is consumed in the system. Not only is the photodecomposition system incomplete but it also does not produce oxygen.

In this process, the Cds semiconductor is light absorbing species. On illumination it absorbs light and this light energy is utilised to transfer an electron from the valence band of the semiconductor to the conduction band. The transfer of electron from the valence band to the conduction band leaves a positive charge in the valence band. The electron of the conduction band is transferred to water via Pt giving hydrogen. The hole in the valence band receives an electron from EDTA (Ethylene diamine tetra-acetic acid) dissolved in water through $RuO_2$ filling the gap which was created by jump of the electron to the conduction band. This cycle continues as long as the system is illuminated and the EDTA in solution decomposes. So the EDTA acts as the sacrificial electron donor and hydrogen is produced at the cost of EDTA. Nitrogen is used to create inert atmosphere in the cell.

The following are the drawbacks in the known system:
(a) It is not a complete cycle for photodecomposition of water and only hydrogen is produced and no oxygen.
(b) The hydrogen is generated at the cost of EDTA.
(c) Yield of hydrogen is very low.

All the aforesaid drawbacks have been overcome by the process according to the present invention which, being the cheapest, not only produces hydrogen but also oxygen using solar energy without, however, consuming fossil fuel, EDTA or electrical energy. The process is a completely free photocatalytic photodecomposition of water where nothing is consumed except water and solar energy.

The ideal method which we have developed for obtaining hydrogen from water has to be the simultaneous oxidation and reduction of water in which the water itself acts as an electron donor and gives oxygen on the one hand and on the other it (water) acts as an electron receiver where it gets reduced to give hydrogen and the energy consumed is solar energy.

The main object of the present invention is to provide a process for the photodecomposition of water to get hydrogen and oxygen using solar energy.

Another object of the invention is to provide a method for the production of a semi-conductor.

It is observed that when colloidal semiconductor loaded with noble metal (as defined herein) and the transition metal oxide is suspended in aqueous solution of dioxygen complex of Ru-EDTA, and the loaded semiconductor is subjected to solar illumination, electrons and positive charge are created in the semiconductor. The term "noble metal" as used in the context of the present invention is a metal selected from the group consisting of Pt, Rh, Ir, and In. The electron in the conduction band of the semiconductor is received by water through the noble metal thereby producing hydrogen and $OH^-$ ions according to the following equations:

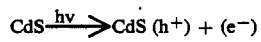

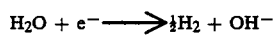

The electron goes to the conduction band and a positive charge is left in the valence band. This valence band receives electrons from the peroxoy species of dioxygen complex and the vacancy created i.e. hole, by electron group by illumination is filled again.

The peroxocomplex after giving electron to the positive charge gets converted to superoxo species. The superoxo species of dioxygen complex receives electron from $OH^-$ resulting in the process liberating oxygen and gets converted back to peroxo species. The same cycle is repeated and $H_2$ and $O_2$ are generated from water. The following are the equations:

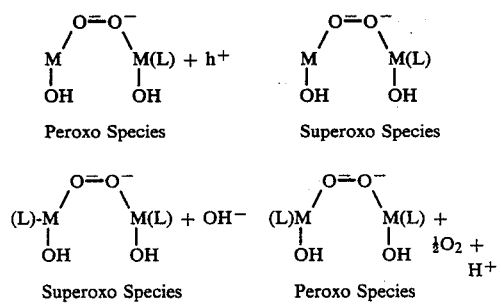

"M" is a metal which can be Ruthenium and L can be Ethylene diamine tetra-acetic acid (EDTA), Hydroxyl ethyl ethylenediamine tetra-acetic acid (HEDTA), Cyclohexane diamine tetra-acetic acid (CDTA), or 1,2-diaminopropane $N,N,N^1,N^1$-tetra-acetic acid (PDTA)

The CdS may be replaced by Zns, $Cd_xZn_xS$, wherein x is an integer, which semiconductor is operative in visible light, and $TiO_2$ or $BaTiO_3$, which is operative under ultraviolet light.

An aqueous solution of dioxygen complex is kept in a pyrex cell. The semiconductor loaded with noble metal and transition metal oxides is suspended in this solution and light is passed through the system under inert atmosphere. The semiconductor employed may be CdS, ZnS, $Cd_xZn_xS$ or CdS doped with $Ag_2S$ or $TiO_2$, $BaTiO_3$. The dioxygen complex of the type [{Ru(L-)(OH)$_2$}$O_2$] where L may be EDTA, HEDTA, CDTA or PDTA. The light used is solar light which can be visible if CdS, Zns, $Cd_xZn_xS$ or CdS doped $Ag_2S$ is used and can be ultraviolet if $TiO_2$ and $BaTiO_3$ is used.

The inert gas employed may be Nitrogen or Argon. The pyrex cell has an inlet to pass inert gas and an outet from where hydrogen and oxygen are collected.

The semiconductor acts as light absorbing species. The noble metal acts as electron transferring catalyst while the $RuO_2$ acts as the positive charge scavanger where the dioxygen complex acts as electron relay between the OH ions and semiconductor. The system under illumination produces $H_2$ and $O_2$ in course of time.

The CdS, ZnS or $Cd_xZn_xS$ available in the market will not work. Only the hexagonal crystal structural form of the semiconductor is suitable which is obtained by precipitation of above at proper conditions and annealed at suitable temperatures, e.g., for CdS ranging from 300° C.–500° C.

The complex $[\{Ru(L)(OH)_2\}O_2]K$ is prepared at a specific pH which should not be either highly acidic or basic pH. The addition of noble metal directly to semiconductor is not effective in the production of $H_2$ and $O_2$ from water under illumination even if all the other contents are added in the system.

Thus, the following procedure is adopted in the production and loading of the semiconductor according to the invention.

(1) Preparation of $[\{Ru(L)(OH)_2\}O_2]K$

This complex is prepared by first preparing Ru(ED-TA)ClK.

The complex $K_2RuCl_5(H_2O)$ is dissolved in a minimum amount of $HClO_4$ (dilute) and added to a hot solution of $Na_2(H_2EDTA)$ dissolved in the requisite volume of $HClO_4$. The mixture is refluxed for two hours. The light yellow solution is filtered and filterate is evaporated to a small volume on a water bath and treated with ethanol and cooled overnight. The light yellow complex is washed with a cooled mixture of acetone and water preferably 9:10, till it is free from chloride ion. It is dried in a desicator.

This yellow complex is dissolved in water and pH of the solution is adjusted to 6.5 to 8.0 by addition of NaOH. Oxygen gas is passed through this solution for half an hour. The yellow solution turns to green indicating the formation of $[\{Ru(L)(OH)_2\}O_2]K$ complex.

(2) Preparation of Semiconductor 1 liter of concentrated solution of $Cd(CH_3COO)_2.2H_2O$ or $Zn(CH_3COO)_2.2H_2O$ and 1 liter of concentrated solution of $(NH_4)_2S$ are thoroughly mixed together by a magnetic stirrer at room temperature. The stirred suspension is brought to boiling point for about 10 minutes. The suspension is allowed to settle for about 24 hours and is subsequently decanted. The precipitate is collected by filtration and dried.

(3) Loading Rh on Semiconductor

An aqueous solution of $RhCl_3.3H_2O$ is added to a suspension of semiconductor and the mixture is stirred for about 30 minutes whereafter the mixture is irradiated in a pyrex cell. The mixture is stored preferably for about 5 hours. The suspended solid becomes yellowish grey during photochemical deposition. The catalyst is centrifuged and dried under vacuum at room temperature.

(4) Platinum Loading on Semiconductor

Requisite quantity of semiconductor powder is added to a dilute acetic acid solution inffered at pH 4.5 containing 6 gms of $H_2PtCl_6.xH_2O$ and 5 ml of 5% $Cd(NO_3)_2.4H_2O$ solution. After ultrasonic stirring the resultant suspension is introduced into a pyrex cell. At a constant temperature the vigorously stirred suspension is deaerated with argon for about 30 minutes and subsequently irradiated for about 30-60 minutes. The photocatalyst is then filtered and dried at about 60° C.

Loading $RuO_2$ on Semiconductor

Loading of $RuO_2$ on semiconductor/noble metal is carried out by dispersing requisite quantity of loaded semiconductor with noble metal in solution of dilute $RuO_4$. The dispersion was illuminated with visible light for about 30-60 minutes to bring out decomposition of $RuO_4$.

$$RuO_4 \rightarrow RuO_2 + O_2$$

The resultant $RuO_2$ precipitates as ultrafine layer into loaded semiconductor. The hydrogen and oxygen are produced for 60 hrs when the system was illuminated with visible light. The loaded semiconductor and the dioxygen complex is recovered after 60 hrs of operation.

According to the present invention there is provided a process for the photocatalytic decomposition of water into hydrogen and oxygen which comprises loading a semiconductor having a hexagonal crystal structure with a noble metal (as defined herein) and a transition metal oxide, suspending the loaded semiconductor in an aqueous solution of dioxygen complex of ruthenium passing light through the suspension of the loaded catalyst maintained under an inert atmosphere and separating the hydrogen and oxygen so formed.

The invention will now be illustrated by the following examples but are not to be construed as a limitation to the scope of the invention.

EXAMPLE 1

50 mg of loaded semiconductor with noble metal and $RuO_2$ is suspended in 25 ml solution of peroxospecies of dioxygen complex in a pyrex cell. The pH of the solution is maintained at which dioxygen complex is stable. The suspension is magnetically stirred and inert gas like argon or nitrogen is passed for ½ an hour. The cell is illuminated by visible light of 505 nm with intensity of 70 mw/cm.

The hydrogen and oxygen generated in the course of time is measured using manometer and analysed by gas chromatograph.

EXAMPLE 2

50 mg of $CdS/Rh/RuO_2$ is suspended in 25 ml solution of $[\{Ru(EDTA)(OH)_2\}O_2]K$ $(0.1 m)^2$ in a pyrex cell. The pH of the solution is maintained at 7.6 by addition of 0.1M NaOH. The suspension is stirred and illuminated after passing $N_2$ gas for ½ an hour. The hydrogen and oxygen generated and the results of $H_2$ and $O_2$ are shown in FIG. 1(A) and FIG. 2(A) of the drawings accompanying this specification.

EXAMPLE 3

50 mg of $CdS/Pt/RiO_2$ was suspended in 25-30 ml solution of $[\{Ru(EDTA)(OH)_2\}O_2]K$ in a pyrex cell at pH 7.6. The suspension was stirred and nitrogen was passed for ½ an hour. The cell when illuminated gave hydrogen and oxygen and the results are shown in FIG. 1(B) and FIG. 2(B) of the drawings.

EXAMPLE 4

This experiment was done similar to examples 1 and 2 except that CdS was loaded with Ir. 50 mg CdS/Ir/RuO$_2$ was suspended in solution of dioxygen complex and irradiated at pH 7.6–8.00. The results are shown in FIG. 1(C) of the drawings.

We claim:

1. A process for the photocatalytic decomposition of water into hydrogen and oxygen which comprises loading a semiconductor having a hexagonal crystal structure with a metal selected from Pt, Rh, Ir and In and a transition metal oxide, suspending the loaded semiconductor in an aqueous solution of dioxygen complex of ruthenium, passing light through the suspended loaded semiconductor maintained under an inert atmosphere and separating the hydrogen and oxygen so formed.

2. A process as claimed in claim 1 wherein the dioxygen complex of ruthenium is represented by the formula [{Ru(L)(OH)$_2$}O$_2$] wherein L is selected from EDTA, HEDTA, CDTA and PDTA.

3. A process as claimed in claim 1 wherein the semiconductor having hexagonal crystal structure is prepared by precipitating the constituents of the semiconductor material and annealing it at a temperature ranging from 300°–350° C.

4. A process as claimed in claim 1 wherein the semiconductor material employed is selected from CdS, ZnS, Cd$_x$Zn$_x$S wherein x is an integer, and CdS doped with Ag$_2$S, TiO$_2$, or BaTiO$_3$.

5. A process as claimed in claim 1 wherein the transition metal oxide is selected from RuO$_2$ and OsO$_4$.

6. A process as claimed in claim 1, wherein the complex is prepared by first preparing [{Ru(L)(OH)$_2$}O$_2$]K by dissolving complex K$_2$RuCl$_5$(H$_2$O) in only a substantially sufficient amount of a dilute aqueous solution of HClO$_4$ to dissolve said complex and adding said solution to a hot solution of Na$_2$(H$_2$L) dissolved in HClO$_4$ where L is EDTA, HEDTA, CDTA or PDTA, refluxing the mixture, filtering and heating the filtrate with ethanol and adjusting the pH to 7.5 to 8.0 and bubbling oxygen therethrough.

7. A process as claimed in claim 1 wherein ruthenium is loaded on the semiconductor by stirring a mixture of an aqueous solution of a ruthenium salt and an aqueous suspension of the semiconductor and thereafter irradiating said mixture in a pyrex cell.

8. A process as claimed in claim 1 wherein the light used is solar light.

9. A process as claimed in claim 8 wherein the solar light is in the visible spectrum and the semiconductor material is CdS, ZnS, Cd$_x$Zn$_x$S or CdS doped with Ag$_2$S, where x is an integer.

10. A process as claimed in claims 1 wherein the light is ultraviolet and the semiconductor material is CdS doped with TiO$_2$ or BaTiO$_3$.

11. A process as claimed in claim 1 wherein the inert atmosphere is created by nitrogen or argon.

* * * * *

UNITED STATES PATENT AND TRADEMARK OFFICE
CERTIFICATE OF CORRECTION

PATENT NO. : 4,889,604

DATED : December 26, 1989

INVENTOR(S) : MIRZA M. KHAN ET AL

It is certified that error appears in the above-identified patent and that said Letters Patent is hereby corrected as shown below:

Title page:     Column 1, Item [75]
Inventors:  Delete "both of Gujarat, India" and insert --
Chhaya Bhardwaj, all of Gujarat, India --.

Signed and Sealed this

Nineteenth Day of February, 1991

*Attest:*

HARRY F. MANBECK, JR.

*Attesting Officer*       *Commissioner of Patents and Trademarks*